(12) United States Patent
Light

(10) Patent No.: US 9,144,715 B2
(45) Date of Patent: Sep. 29, 2015

(54) GOLF BALL RETRIEVER

(71) Applicant: I Gotcha Holdings, LLC, Winter Springs, FL (US)

(72) Inventor: Albert James Light, Winter Springs, FL (US)

(73) Assignee: BAG BOY, LLC, Richmond, VA (US)

( * ) Notice: Subject to any disclaimer, the term of this patent is extended or adjusted under 35 U.S.C. 154(b) by 0 days.

(21) Appl. No.: 14/160,118

(22) Filed: Jan. 21, 2014

(65) Prior Publication Data

US 2015/0202501 A1    Jul. 23, 2015

(51) Int. Cl.
*A63B 47/02* (2006.01)
*B25J 1/04* (2006.01)

(52) U.S. Cl.
CPC ... *A63B 47/02* (2013.01); *B25J 1/04* (2013.01)

(58) Field of Classification Search
CPC .......... A63B 47/02; A63B 47/021; B25J 1/04
USPC ....................................................... 294/19.2
See application file for complete search history.

(56) References Cited

U.S. PATENT DOCUMENTS

| | | | |
|---|---|---|---|
| 3,306,649 A * | 2/1967 | Zagwyn | 294/19.2 |
| 5,265,926 A | 11/1993 | DiNardo | |
| 2006/0229145 A1* | 10/2006 | Dempsey | 473/408 |
| 2014/0035303 A1* | 2/2014 | Nihra et al. | 294/19.2 |
| 2014/0138967 A1* | 5/2014 | Miller | 294/19.2 |

* cited by examiner

*Primary Examiner* — Dean Kramer
(74) *Attorney, Agent, or Firm* — Troutman Sanders LLP; Ryan A. Schneider; John A. Morrissett

(57) ABSTRACT

A device for retrieving an object such as a golf ball. The retriever comprises a handle, a stationary member or loop that is rigidly attached to the handle, a reactive member or loop that is pivotally attached to the stationary member and a spring for biasing the reactive member substantially perpendicular to the stationary member. A locking clip is attached to the stationary member and is rotatable between a locking position and an unlocking position. In the locking position, the clip restrains the reactive member in a position substantially parallel to the stationary member so that the retriever can be stored without the reactive member rotating into the perpendicular position.

18 Claims, 3 Drawing Sheets

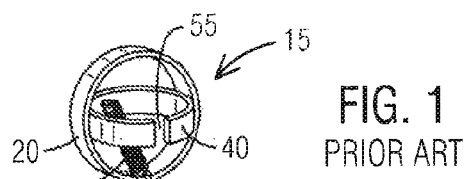
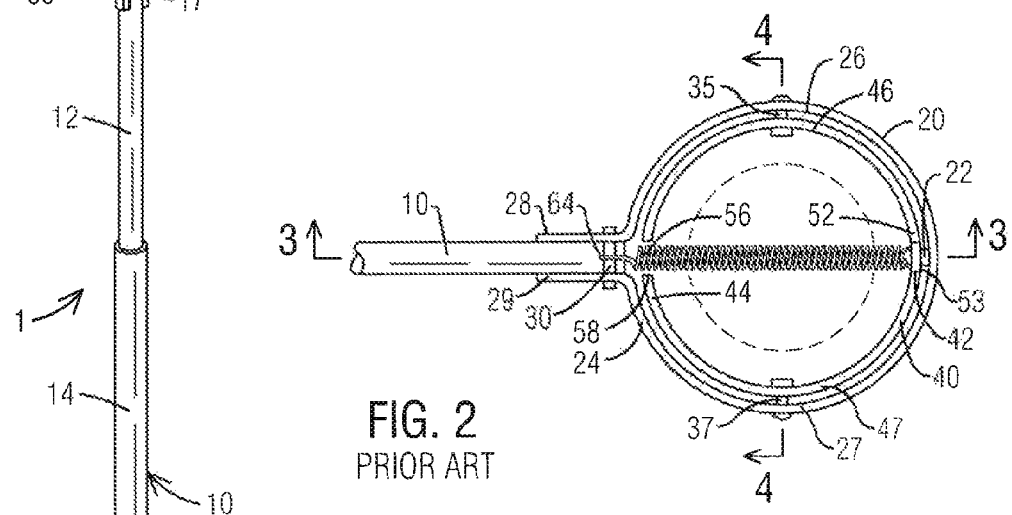
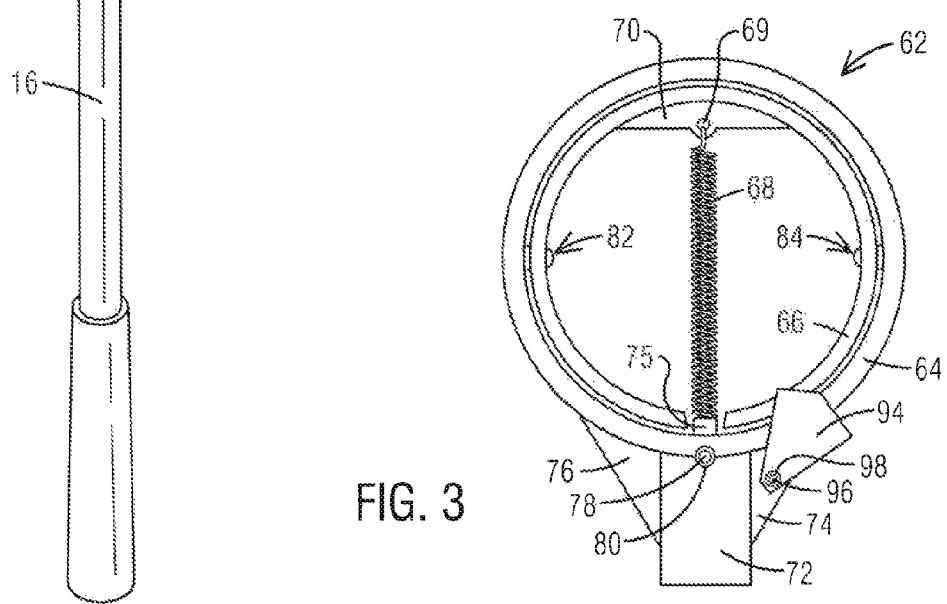

US 9,144,715 B2

GOLF BALL RETRIEVER

SUMMARY OF THE INVENTION

The present invention is an improvement to the golf ball retriever shown in U.S. Pat. No. 5,265,926, the full disclosure of which is hereby incorporated by reference. The '926 patent describes a device for retrieving an object such as a golf ball. In a first preferred embodiment, the retriever comprises a handle, a stationary member that is rigidly attached to the handle, a reactive member that is pivotally attached to the stationary member, and a spring for biasing the reactive member substantially perpendicular to the stationary member. The present invention incorporates a clip for locking the reactive member in a plane co-extensive with said stationary member for storage thereof. The biasing means is preferably a spring positioned inside the reactive member and coupled between a point on the reactive member and a point on the stationary member. The clip is pivotably attached to the stationary member and pivotable between a position for locking the reactive member into a fixed planar alignment with the stationary member.

Prior to capturing the golf ball, the retriever is set so that the stationary and reactive members are substantially parallel, i.e., the members are aligned in a common plane. An operator then releases the clip and directs the retriever so that the spring contacts the golf ball. This trips the spring and causes the reactive member to pivot into a substantially perpendicular position with respect to the stationary member—the golf ball being captured inside the stationary and reactive members. After using the retriever, the operator typically collapses the telescoping handle, moves the clip into a locking position and places the retriever into a golf bag.

The retriever constructed in accordance with the design shown in the '926 patent also has a number of defects. For example, the connection between the reactive member and the spring is known to break and the pivot pins on which the reactive member rotates create a binding joint. The present invention addresses the issues by creating a support for the spring that extends along an arc of the reactive member to both stiffen the member and to produce a stronger support. Further, the pivot pins are incorporated into the stationary member and have a larger diameter as well as a base to space the reactive member from the stationary member.

An advantage of the present invention is that the clip locks the stationary and reactive members in a common plane so that the retriever can be stored without the members rotating so as to prevent damage to the retriever when placed in a golf bag or other storage place.

Other features and advantages of the invention will be apparent from the following specification and drawings.

BRIEF DESCRIPTION OF DRAWINGS

FIG. 1 is a plan view of the retriever of the prior art with a telescoping handle.

FIG. 2 is a top plan view of the ball retriever head of FIG. 1.

FIG. 3 is a top plan view of the ball retriever head of the present invention with the pivotable or reactive loop in a closed or locked position.

DETAILED DESCRIPTION OF THE INVENTION

Figure 4:
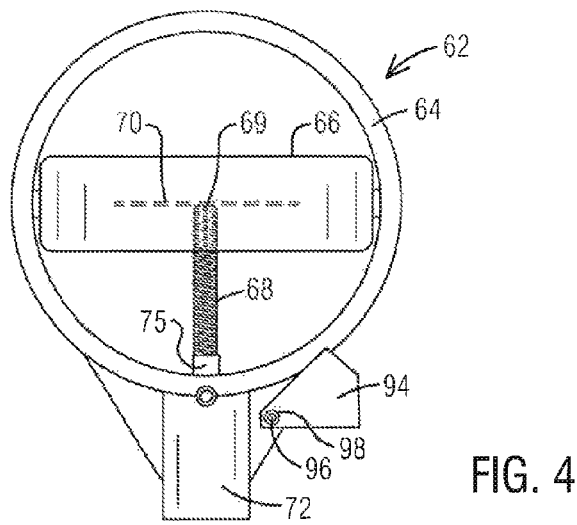
FIG. 4 is a top plan view of the ball retriever head of the present invention with the pivotable or reactive loop in an open or unlocked position.

FIGS. 1 and 2 illustrate one form of prior art device for retrieving objects such as golf balls and is indicated generally by reference number 1. The retriever 1 generally comprises a handle 10, a stationary loop or member 20, a reactive loop or member 40 and a coiled tension spring 60 for biasing the reactive member to pivot into a preferable substantially perpendicular position with respect to the stationary member. That portion of the retriever comprising the two loops 20 and 40 and the spring 60 is generally referred to as the head 15. The handle 10 is a telescoping handle and loops 20 and 40 are preferably made of a light weight, rigid plastic.

FIG. 2 is an enlarged drawing of the head 15. The stationary member 20 is a loop having a top 22, a bottom 24 and two side portions 26 and 27. Bottom portion 24 of stationary loop 20 has tabs 28 and 29 which conform to the shape of and are rigidly attached to the end 17 of handle 10.

A pin 30 is used to rigidly secure stationary loop 20 to handle 10. This is done by forming holes in tabs 28 and 29 and handle end 17. Pin 30 is inserted through these holes and its ends are riveted or flattened to keep it from falling out and to ensure that tabs 28 and 29 fit snugly against handle 10.

Pivot pins 35 and 37 are inserted into the side portions 26 and 27 of stationary loop 20 to facilitate the pivotal attachment of reactive loop 40 within the stationary loop 20. Pivot pins 35 and 37 are spaced 180 degrees apart.

Reactive loop 40 has a top 42, a bottom 44 and two side portions 46 and 47 and is sized to fit inside stationary loop 20. Side portions 46 and 47 have holes for receiving pivot pins 35 and 37 which pivotally attach reactive loop 40 to stationary loop 20. Holes 52 and 53 are provided in the top portion 42 of reactive loop 40 for facilitating the attachment of the end of a biasing spring 60 which serves to bias reactive loop 40 into a perpendicular position with respect to stationary loop 20. Spring 60 is a cylindrical helical spring with hooks 62 and 64 at each of its two ends 66 and 68. Hooks 62 and 64 are formed by bending the outer helical loops of spring 60 perpendicular to the cylindrical spring. One end 66 of spring 60 is attached to the top portion 42 of reactive loop 40 by passing hook 62 through holes 52 and 53. The other end 68 of spring 60 is attached to handle 10 by looping hook 64 around pin 30.

To operate the retriever 1, reactive loop 40 is set substantially parallel to stationary loop 20 as shown in FIG. 2. In this set position, spring 60 is stretched and exerts a force on reactive loop 40. Because spring 60 is substantially parallel to loops 20 and 40 when in this set position, the force exerted by spring 60 on reactive loop 40 is met by an equal and opposite force exerted by pins 35 and 37. Thus, reactive loop 40 remains in its set position inside the stationary loop 20.

A portion of the bottom portion 42 of reactive loop 40 is removed to form an opening to allow the loop 40 to rotate through the spring 60. The opening is sized to be less than the diameter of the spring so that there is some degree of binding as the loop 40 tries to rotate from the set position. The ends or jaws 56, 58 of the loop 40 defining the opening are notched to accommodate spring 60 when in the set position. Therefore, jaws 56 and 58 frictionally engage spring 60 in the set position. This frictional contact helps prevent the retriever 1 from inadvertently triggering while an operator is directing the retriever towards the object. The frictional engagement does not substantially inhibit the object from dislodging or triggering spring 60 to rotate the reactive loop 40 inside the stationary loop 20.

When an object contacts and pushes against spring 60, spring 60 and reactive loop 40 pivot slightly out of parallel with stationary loop 20. Top portion 42 of loop 40 rotates away from the object and this results in a misalignment of forces exerted on reactive loop 40 by spring 60 and pins 35 and 37. The misalignment of forces creates a torque that causes the top portion 42 of reactive loop 40 to rotationally accelerate toward spring 60 which rapidly returns to its relaxed position, and thereby capture the object to be retrieved.

The retriever head design of FIGS. 1 and 2 suffers from a number of weaknesses and assembly issues. For example, the stationary loop often breaks at the connection between the stationary loop and the retriever handle. Further, the spring connection to the reactive loop distorts the loop causing it to bind and has been the source of breakage. Still further, the use of rivet type pins at the pivot point between the two loop causes binding of the loops. Moreover, many complaints have been experienced because of rotation of the reactive loop within the stationary loop when the retriever is being stored causing separation of the loops and even some breakage.

Figure 5:
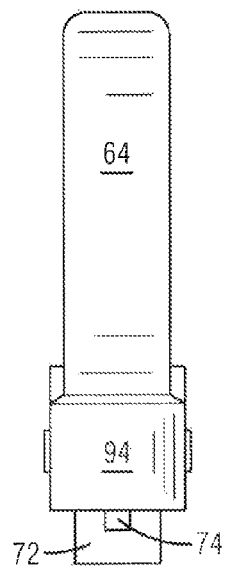
FIG. 5 is an edge view of the retriever head of FIG. 3.

Turning now to FIGS. 3 and 4, there are top plan view of an improved retriever head 62 which overcomes some of the known deficiencies in the prior art head. The head 62 includes an outer stationary loop 64 and an inner pivoting reactive loop 66 along with a biasing spring 68. FIG. 3 is a view with the reactive loop 66 aligned in a plane of the stationary loop 64 while FIG. 4 is a view with the reactive loop 66 rotated 90 degrees. FIG. 5 is an edge view of FIG. 3. The reactive loop 66 is molded with a support bracket 70 extending along an inner surface of the loop over an arcuate section of about sixty degrees. A hole 69 is formed in the bracket 70 for attachment of one end of the spring 68. The bracket 70 distributes the force of the spring over a broad area and also provides support to minimize distortion of the loop 66 due to tension of the spring. The opposite end of the spring 68 attaches to the stationary loop 64 in a manner similar to that shown in FIG. 1, i.e., an end loop of the coiled spring wraps around a rivet 71 that attaches the head 62 to the shaft handle 10 shown in FIG. 1. A pair of opposed guides 75 are formed at the lower arc of loop 64 on opposite sides of the spring 68 to assist in aligning the loop 66 and protecting the base of the spring.

Figure 4A:
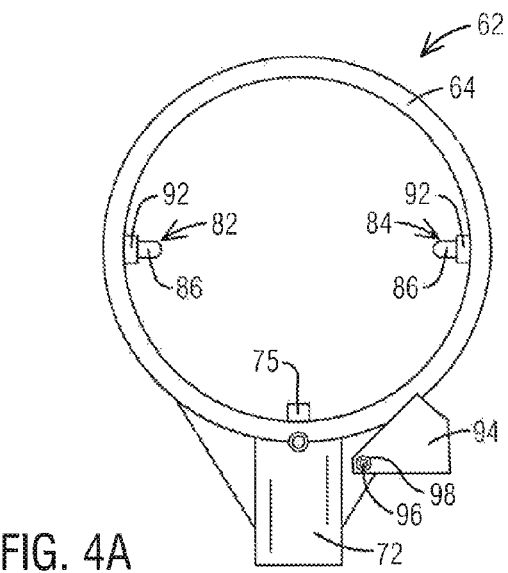
FIG. 4A is a top plan view of the head of FIG. 3 with the inner pivoting loop removed.

The stationary loop 64 is improved by the incorporation of an enclosed coupling or receptacle 72 for receiving the end of the handle 10. The coupling 72 is essentially a tube that is integrally molded to the stationary loop 64 and sized to receive an end of the handle 10. The receptacle 72 replaces the tabs 28 and 29 shown in FIG. 1. Further, the receptacle 72 is supported by a pair of gussets 74 and 76. In one embodiment, the receptacle 72 has an outside diameter of about ½ inch and the gussets have a thickness of about ⅛ inch. The handle 10 preferably takes the form of the handle shown in U.S. Pat. No. 7,073,228. A pin 78 is pressed through a hole 80 extending through the receptacle or coupling 72 and an inserted end of the handle 10 to affix the handle to the retriever head. In one form, the stationary loop 64, receptacle 72 and gussets 74, 76 are integrally molded of commercially available high-strength plastic material. During the same molding, reactive loop support studs or pins 82 and 84 are formed along an inside surface of the stationary loop as best seen in the view of FIG. 4A. The pins are spaced apart 180 degrees and at 90 degree displacement from the center of the receptacle 72. Each pin 82, 84 has a base 92 of about ¼ inch diameter and about 1/16 inch in height. An upper portion 86 of each pin functions as an axle for the reactive loop and is about 3/16 inch in height and about 3/16 inch in diameter or about 4.75 mm. The upper portion 86 fits into a mating hole in the reactive loop 66 which hole has sufficient clearance to allow the reactive loop to pivot freely on the pins 82,84. The base 92 of each pin spaces the reactive loop from the stationary loop to prevent binding of the loops. For the above dimensions, the outer diameter of the stationary loop is about 71 mm and its wall thickness is between about 3.5 and 4 mm. The reactive loop 66 has a nominal outer diameter of about 61 mm to fit between the pin bases 92. The depth of the stationary loop is about 13.5 mm while the depth of the reactive loop is about 12.5 mm or about 1 mm less than the depth of the stationary loop so that the stationary loop slightly protects the reactive loop.

An important feature of the present invention is the clip 94 pivotably attached to the stationary loop 64 at the gusset 74. As shown in FIGS. 3 and 4, the clip 94 is a U-shaped clip sized to fit snugly about the stationary loop 64 when in the locked or closed position. The clip 94 pivots on a pin 96 extending from one side of the clip through the gusset 74. The pin 96 is preferably a spring pin, sometimes called a rolled pin, that is compressed radially in a hole 98 in the clip and gusset. The characteristic tendency of the pin to expand radially keeps it tightly in the hole 98 and creates friction so that the clip has some resistance to pivoting. FIG. 4 shows the clip 94 in the open or unlocked position so that the reactive loop 66 is free to pivot within the stationary loop 64.

Figure 6:
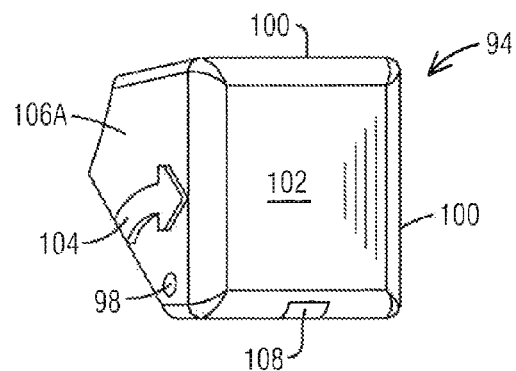
FIG. 6 is a perspective view of the locking clip of FIG. 3.
Figure 7:
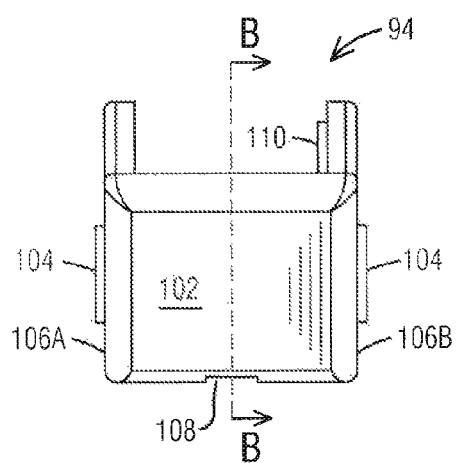
FIG. 7 is a plan view of the clip of FIG. 6.
Figure 8:
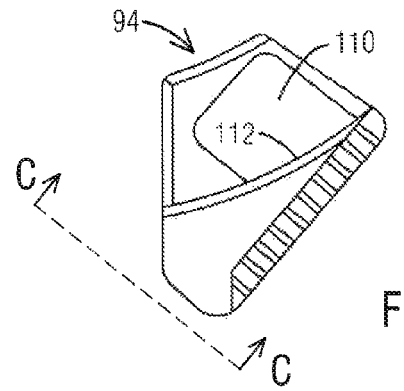
FIG. 8 is a cut-away view of the clip of FIG. 7 taken along the line B-B.

FIG. 6 is a bottom perspective of the clip 94 and shows chamfered edges 100 that are added for comfort around an external surface of a bottom segment 102. An embossed or raised arrow 104 is molded onto an outer surface of side 106A of the clip to indicate the direction of rotation to unlock the retriever. A raised arrow 104 is also molded onto an outer surface of the opposite side 106B of the clip as shown in FIG. 7. The hole 98 for the pin 96 is also visible in this perspective view in side 106A as is the beginning of a slot 108 in which the gusset 74 sits. FIG. 7 is a plan view looking at the bottom segment 102 at a slight angle such that the sides 106A and 106B are partially visible and the beginning of slot 108 is still visible. The raised arrows 104 are visible on each side surface 106A and 106B. It can also be seen that there is a slightly raised feature 110 on an inside surface of side 106B. The feature 110 is shown more clearly in the cutaway view of FIG. 8 taken along the line B-B of FIG. 7. FIG. 8 also shows how the clip is aligned for the view of FIG. 7. Feature 110 provides a slight step-up of about 0.2 mm to decrease the spacing between the inner surfaces of sides 106A and 106B. As the clip 94 is pivoted or rotated into a locking position, the leading edges of the sides 106A and 106B slip easily over the stationary loop 64 until the leading edge of the feature 110 engages the stationary loop at which point additional force is required to completely pivot the clip into the locking position as shown in FIG. 3. The feature 110 puts added pressure on the stationary loop 64 so that the clip is retained in the locking position by the frictional reaction between the inner surface of the side 106A and the raised feature 110 on the inner surface of the side 106B.

Figure 9:
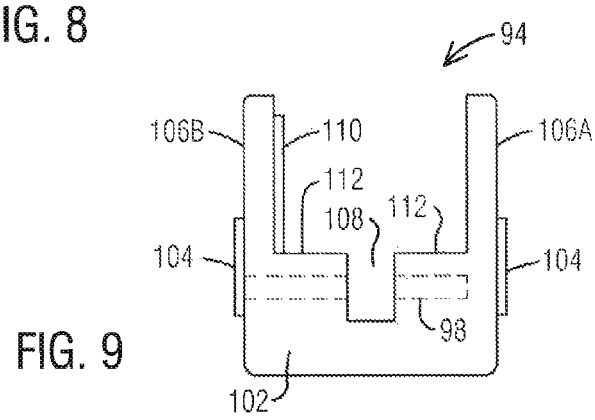
FIG. 9 is an end plan view of the clip of FIG. 6 taken along the line C-C of FIG. 8.

Considering FIG. 8 and FIG. 9, which is a plan view of the clip 94 taken from one end in the direction indicated by the line C-C in FIG. 8, it can be seen that the slot 108 extends through the clip. The slot 108 is defined by a pair of arcuately shaped elements 112 on each side thereof. The arcuate shape has approximately the same radius of curvature at that of the outer circumference of the stationary loop 64 so that the elements 112 abut relatively smoothly against the stationary loop when the clip is in a closed or locked position. It is noted that the pin 96 passes through the thickened portion of the clip 94 at the hole 98. It is desirable that the pin 96 not pass completely through the clip 94 so that the pin does not get inadvertently pushed out of the assembly. FIG. 8 shows that the hole 98 in the clip 94 terminates within one side portion of one of the elements 112.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A device for retrieving an object comprising:
   a handle;
   a stationary loop rigidly attached to said handle;
   a reactive loop pivotally attached to said stationary loop;
   means for biasing said reactive loop substantially perpendicular to said stationary loop, each of said loops substantially surrounding the object when positioned substantially perpendicular to each other; and
   a clip pivotably attached to the stationary loop and moveable between a first and second position for latching and unlatching said reactive loop with respect to said stationary loop.

2. The device of claim 1, wherein said reactive loop is positioned inside said stationary loop and is adapted to rotate relative thereto in response to said biasing means.

3. The device of claim 2, wherein said stationary loop and said reactive loop have top, bottom and side portions, said bottom portion of said stationary loop being attached to said handle and said side portions of said reactive loop being pivotally attached to said side portions of said stationary loop, said clip being attached to said stationary loop adjacent said handle.

4. The device of claim 3, wherein said biasing means is a spring.

5. The device of claim 4, wherein said spring is a cylindrical helical spring having two ends, one end being attached to said top portion of said reactive loop and said other end being attached to said handle.

6. The device of claim 5, wherein said bottom portion of said reactive loop is notched and said spring passes through said notch.

7. The device of claim 6, wherein said stationary loop includes a pair of radially inwardly protruding studs adapted to fit into a mating pair of holes in said reactive loop, each of said studs having a base portion for spacing said reactive loop from said stationary loop, said studs being located for enabling said reactive loop to pivot within said stationary loop.

8. The device of claim 7 wherein said reactive loop includes an integrally formed bracket extending along an arcuate segment of said reactive loop along said top portion thereof, said spring being attached to said reactive loop at a central portion of said bracket.

9. The of claim 8 wherein said studs each have a diameter of at least about 4.75 millimeters.

10. The device of claim 9 wherein said studs comprise an axle portion wherein said axle portion has a smaller diameter than said base portion, said axle portion being at least about 4.75 mm in diameter.

11. The device of claim 3 wherein said clip comprises a generally U-shaped device having a pair of opposed side members and a base, said base having at least one area sufficiently thick to support the device via an axle pin extending through a portion of the base and said stationary loop, said device being pivotable on said pin between a locking position and an unlocking position wherein said reactive loop is retained in a plane co-extensive with said stationary loop in said locking position.

12. The device of claim 11 wherein said stationary loop includes a handle mounting extension extending radially outward at said bottom portion thereof and being fixed in position by a gusset formed between said extension and said stationary loop, said clip being pivotably coupled to said gusset via said axle pin.

13. The device of claim 12 wherein said axle pin comprises a spring pin passing through a hole in said clip base and a mating hole in said gusset.

14. The device of claim 13 wherein said base of said clip is formed with a slot extending at least partially therethrough, said slot being sized and configured to fit about at least a portion of said gusset, and wherein said hole in said base passes only partially through a section of said clip base on one side of said gusset whereby said spring pin is only visible from one surface of said clip.

15. The device of claim 12 wherein said handle extension comprises a tubular coupling for receiving an end of said handle and said coupling is supported on opposite sides thereof by a pair of gussets, one of said gussets comprising the gusset for attachment of said clip.

16. The device of claim 11 and including a raised platform formed on an inner surface of at least one of said U-shaped side members for pressing against an edge of said stationary loop when said clip is in a locking position.

17. The device of claim 16 wherein said raised platform is recessed from a leading edge of said clip.

18. The device of claim 1, wherein said handle is a telescoping handle.

* * * * *